United States Patent [19]
Stueckle et al.

[11] Patent Number: 5,148,152
[45] Date of Patent: Sep. 15, 1992

[54] FOOT PEDAL CONTROL MECHANISM FOR COMPUTERS

[76] Inventors: Duane H. Stueckle, 200 Parkway Dr., Boise, Id. 83706; Duane L. Allen, 411 S. 15th Ave., Unit F, Nampa, Id. 83651

[21] Appl. No.: 640,160

[22] Filed: Jan. 11, 1991

[51] Int. Cl.$^5$ .................................................. G09G 5/00
[52] U.S. Cl. ........................................ 340/706; 434/45; 273/148 B; 273/DIG. 28
[58] Field of Search ............. 340/706, 709; 273/85 G, 273/148 B, DIG. 28, DIG. 18; 400/475; 434/45; 244/234, 235, 236; 74/512, 560; 338/153

[56] References Cited

U.S. PATENT DOCUMENTS

| | | | |
|---|---|---|---|
| 3,720,007 | 3/1973 | McKechnie et al. | 358/217 |
| 4,106,362 | 8/1978 | Hildebrecht | 74/512 |
| 4,180,812 | 12/1979 | Kaltenbach | 340/706 |
| 4,280,285 | 7/1981 | Haas | 434/30 |
| 4,630,817 | 12/1986 | Buckley | 273/DIG. 28 |
| 4,713,007 | 12/1987 | Alban | 434/45 |

FOREIGN PATENT DOCUMENTS 0151580 11/1981 Japan.
0140832 8/1983 Japan.

*Primary Examiner*—Jeffery A. Brier
*Attorney, Agent, or Firm*—Paul F. Horton

[57] ABSTRACT

A foot pedal mechanism for controlling input to a computer. The mechanism is particularly useful in computer video simulation programs. The mechanism offers realistic foot pedal action for rudder control, braking, speed control, or the like. The mechanism includes a housing placeable upon the floor; a pair of spring biased foot pedals pivotally engaging the housing in a side by side relationship for parallel vertical movement relative to one another; a potentiometer mounted within the housing and having an input into a computer, the potentiometer provided with an elongated shaft; and a cable having opposing ends affixed to the pedals and a central portion engaging the potentiometer shaft. Pivotal movement of the pedals rotate the shaft for controlling potentiometer input into the computer. Arms, radially extending from the potentiometer shaft and connected to the cable, permit realistic movement of the pedals and prevent excessive rotation of the shaft.

6 Claims, 1 Drawing Sheet

FOOT PEDAL CONTROL MECHANISM FOR COMPUTERS

BACKGROUND OF THE INVENTION

1. Field of the Invention

This invention relates, in general, to computer compatible joysticks and like mechanisms for computer simulation, and, more particularly, to foot pedals mechanisms for computer control.

2. Description of the Prior Art

There are many computer programs which create simulations of various activities such as flight simulators; boating simulators; and driving simulators in which the operator controls speed, direction, braking, and other factors normally associated with the activity. Many of such programs are controlled by the well-known, hand operated, joystick.

In actual use, foot control is often used for rudder control, speed control, braking, and the like. For increased realism, then, it is highly desirable to use foot pedals in like ways for computer simulation of the activities.

Foot pedals for visual display simulators are suggested by R. Haas, U.S. Pat. No. 4,280,285; J. McKechnie, U.S. Pat. No. 3,720,007; and E. P. Alban, U.S. Pat. No. 4,713,007.

Alban discloses foot pedals to simulate control of a rudder. A potentiometer, with vertically extending shaft, is actuated by pedals mounted to a common cross arm which is affixed to the rotatable shaft.

Prior art foot pedal mechanisms for computer simulation, as typified by Alban, are impractical and lack realism in that pedal depression is not a vertical plane, but rather the pedals travel in an orbit about a common pivot point; pressure on the pedals cause the mechanism to tip over because of lateral rather than downward pressure; there is a lack of pedal return biasing; no limit is provided to pedal movement; and excessive torque is applied to the potentiometer shaft.

SUMMARY OF THE INVENTION

The present invention overcomes these problems in the prior art by providing a foot pedal control mechanism for computer simulation which includes a housing; a pair of foot pedals, each pivotally mounted to the housing; pedal return biasing means; and a cable connected to a potentiometer shaft and each of the pedals for rotation of the shaft upon depression of a respective pedal.

It is, therefore, a primary object of the present invention to provide a foot pedal control mechanism for computer simulation which provides realistic pedal movement in the actuation of a potentiometer for computer input.

It is also an object of the present invention to provide a foot pedal control mechanism for computer simulation wherein the potentiometer is isolated from torque placed upon the pedals.

A further object of the present invention is to provide a foot pedal control mechanism for computer simulation having biasing means for returning foot pedals to a neutral position.

Another object of the present invention is to provide a foot pedal control mechanism for computer simulation wherein the pedals are pivotal toward the floor for increased stability.

Still another object of the present invention is to provide a foot pedal control mechanism for computer simulation having a potentiometer shaft provided with radially extending arms engageable with a pedal driven cable to lessen the linear to rotary proportional difference as the pedal approaches full depression.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
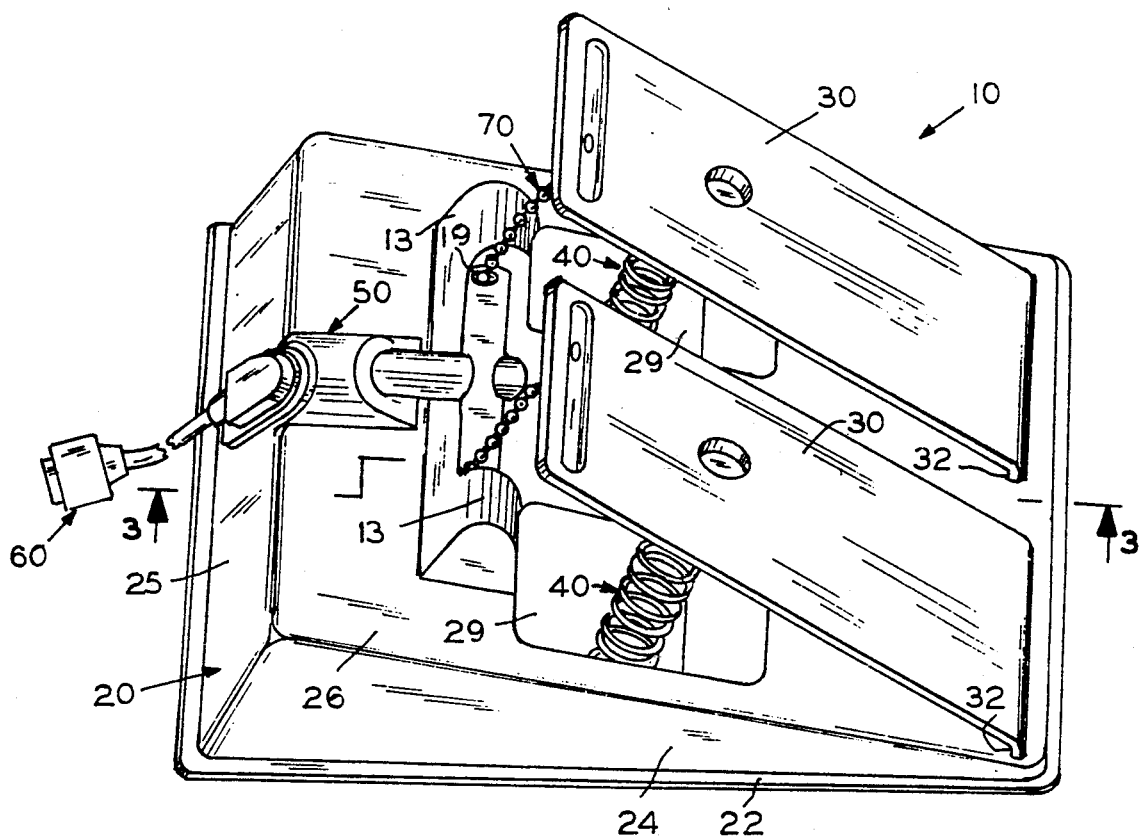
FIG. 1 is a perspective view of a preferred embodiment of the pedal control mechanism of the present invention.
Figure 3:
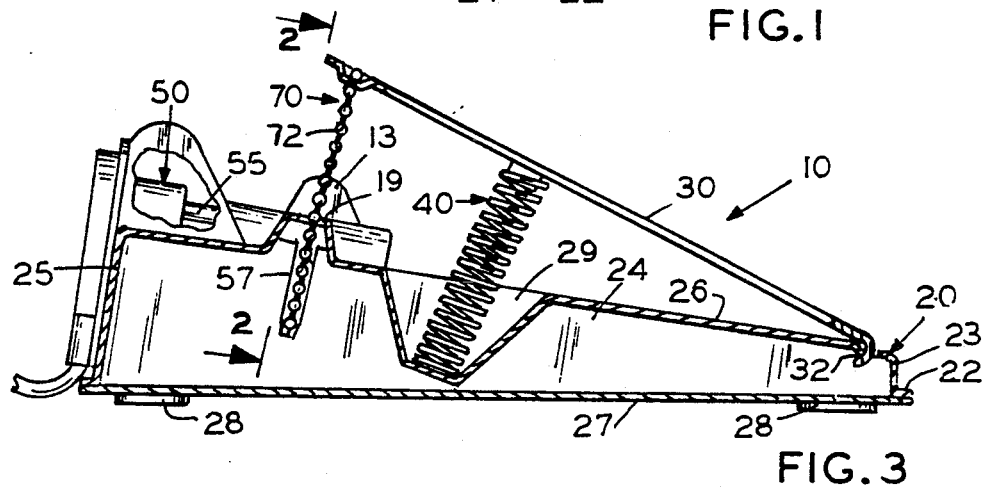
FIG. 3 is a sectional view of the pedal control mechanism of FIG. 1, taken along lines 3—3.

Referring now to the drawings, an embodiment to be preferred of a foot pedal mechanism 10 for computer simulation programs is disclosed. Mechanism 10 includes, generally, a housing 20; a pair of foot pedals 30; bias means 40 extending between the housing and pedals; a potentiometer 50; means 60 for electrically connecting mechanism 10 to a computer, not shown; and a cable 70 for connecting the foot pedals to the potentiometer for actuation thereof.

Housing 20 is preferably molded from conventional plastics and includes a base portion 22, a rear wall 23, a pair of opposing sidewalls 24 tapering downwardly from back to front, a front wall 25, and a top wall 26. Housing 20 also preferably includes a bottom wall 27 to define an enclosure within the housing. The bottom wall may be provided with anti-skid pads 28 for holding the housing in place on the floor. Top wall 26 defines a pair of recesses 29 for placement and securement of bias members 40. Top wall 26 also defines a pair of projections 13 for limiting downward movement of pedals 30, and a pair of spaced apertures 19 opening into the enclosure defined by the housing for entrainment of cable 70 therethrough.

A pair of foot pedals 30, laterally parallel with one another, pivotally engage housing 20 adjacent the forwardmost end of the housing by means of suitable hinges 32. Each of the pedals move in a vertical plane about the respective pivots and are biased in an upward, neutral position by bias means 40 which may comprises a pair of compression springs, each of the springs extending between the housing and a downwardly depending projection defined by or affixed to the underside of the pedals.

Figure 2:
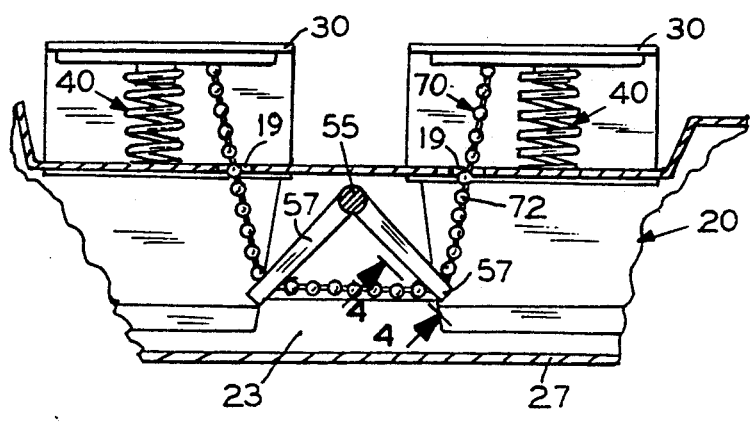
FIG. 2 is a partial sectional view taken along lines 2—2 of FIG. 3 showing connection of the potentiometer to the pedal actuated cable.
Figure 4:
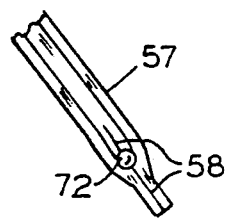
FIG. 4 is a partial sectional view taken along lines 4—4 of FIG. 2 showing the connection between the cable and a potentiometer arm.

Securely mounted to housing 20 on rear wall 23 is a potentiometer 50, electrically connected to the input of a computer by means of a conventional cable 60. Potentiometer 50 is mounted so that its rotatable shaft 55 extends forwardly in a plane parallel with the pedals. Shaft 55 may directly engage the cable 70, or, as is preferred, the shaft is provided with two or more radially extending arms 57 for engagement with cable 70, as shown to advantage in FIG. 2. Arms 57 effectively increase the diameter of the shaft so that rotation of the shaft is not excessive upon depression of a foot pedal, as it would otherwise be if cable 70 were geared directly to the shaft. The arms, in effectively increasing the diameter of the shaft, also permit substantially vertical movement of the cable between a respective pedal and shaft arm to prevent excessive inward pull on the pedals, thus giving a natural "feed" to pedal movement.

Cable 70 may be constructed of any suitable material. It has been found that a key-chain type cable, including a series of interlinked spheres stubs, works very well in clamping the chain to pedals 30 and to shaft 55 by means of arms 57 which are provided with clamp slots 58 at their free ends for connection with the chain. Cable 70 is connected, at one end, to the underside of one of the pedals 30; and is then threaded downwardly through an aperture 19 of top wall 26 of housing 20. The central portion of the chain is then caused to engage a respective arm 57 of shaft 55 by means of the clamp slot; is caused to engage the other arm or arms, likewise, and then is threaded upwardly through the other aperture 19, where it is connected to the remaining pedal 30. It will be seen that spheres 72 of the chain securely engage the clamp slots 58 to prevent any slippage. The cable is placed under a selected degree of tension by compression springs 40 for positive rotation of the potentiometer shaft upon depression of either pedal.

For operation, foot pedal mechanism 10 is placed on the floor and electrically connected to a computer by means of connector cable 60 for controlling, for example, a rudder in a flight simulator program. Without pressure on the pedals, mechanism 10 is in a neutral position. As one pedal is depressed by the foot of the operator, against the bias of its compression spring 40, the other pedal is lifted by means of its compression spring. Cable 70, having its end portions connected to respective pedals, and its mid-portion connected to shaft 55, preferably my means of arms 57, causes rotation of the potentiometer shaft to cause a corresponding change in the electrical input signal to a computer for simulated rudder control.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

We claim:

1. Foot pedal control apparatus for computer control comprising:
    a housing;
    a pair of foot pedals, each of said foot pedals pivotally mounted to said housing;
    bias means extending between said housing and each of said pedals for biasing each of said pedals away from said housing;
    a potentiometer mounted to said housing, said potentiometer provided with a rotatable shaft;
    means for electrically connecting said potentiometer to a computer; and
    a cable having ends of which are connected to each of said pedals and a central portion which is connected to said shaft of said potentiometer for rotating the shaft in a selected direction upon the depression of one of said foot pedals for controlling potentiometer input to a computer.

2. The apparatus as described in claim 1 wherein said housing is provided with at least one aperture opening through said housing for threading of the said cable therethrough.

3. The apparatus as described in claim 1 wherein said bias means includes two compression springs, each of said springs mounted between said housing and a respective pedal.

4. The apparatus as described in claim 1 wherein said shaft of said potentiometer is provided with at least two radially extending arms, each of said arms engaging said cable for substantially vertical movement of said cable between a respective pedal and shaft arm upon rotation of said shaft of said potentiometer.

5. Foot pedal control apparatus for computer simulators comprising:
    a housing;
    a pair of foot pedals, each of said pedals independently and pivotally mounted to said housing for parallel movement in a vertical plane relative to one another;
    two compression springs, each of said springs mounted between a respective pedal and said housing for biasing the pedal upwardly and away from said housing;
    a potentiometer mounted within said housing, said potentiometer provided with an elongated rotatable shaft extending between and in parallel relationship with each of said pedals;
    means for electrically connecting said potentiometer to a computer; and
    a cable having two end portions and a central portion, each of said end portions connected to a respective pedal and the central portion connected to said shaft of said potentiometer through one or more apertures in said housing, said cable operable to rotate the shaft of said potentiometer in a selected direction upon depression of one of said pedals for controlling potentiometer input to a computer.

6. The apparatus as described in claim 5 further comprising two arms connected to and radially extending from said potentiometer shaft for increasing the effective diameter of said shaft, each of said arms in engagement with said cable for substantial vertical movement of said cable between a respective arm and pedal.

* * * * *